United States Patent
Hendriks et al.

(10) Patent No.: US 7,394,549 B2
(45) Date of Patent: Jul. 1, 2008

(54) METHOD AND ARRANGEMENT FOR OPTICAL COHERENCE TOMOGRAPHY

(75) Inventors: Robert Frans Maria Hendriks, Eindhoven (NL); Egbert Lenderink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 409 days.

(21) Appl. No.: 10/539,969

(22) PCT Filed: Nov. 17, 2003

(86) PCT No.: PCT/IB03/05242

§ 371 (c)(1),
(2), (4) Date: Jun. 19, 2005

(87) PCT Pub. No.: WO2004/055473

PCT Pub. Date: Jul. 1, 2004

(65) Prior Publication Data

US 2006/0094939 A1 May 4, 2006

(30) Foreign Application Priority Data

Dec. 18, 2002 (EP) .................. 02080389

(51) Int. Cl.
*G01B 9/02* (2006.01)
*G01B 11/02* (2006.01)

(52) U.S. Cl. ........................ 356/497; 356/479

(58) Field of Classification Search ........... 356/497, 356/479
See application file for complete search history.

(56) References Cited

U.S. PATENT DOCUMENTS

| 5,847,827 | A | 12/1998 | Fercher | |
|---|---|---|---|---|
| 6,057,920 | A | 5/2000 | Fercher et al. | |
| 6,208,415 | B1 * | 3/2001 | De Boer et al. | 356/450 |
| 7,242,833 | B2 * | 7/2007 | Yang et al. | 385/117 |
| 2002/0085209 | A1 * | 7/2002 | Mittleman et al. | 356/497 |
| 2003/0023153 | A1 * | 1/2003 | Izatt et al. | 600/407 |
| 2004/0021874 | A1 * | 2/2004 | Shimmick | 356/497 |
| 2005/0018201 | A1 * | 1/2005 | de Boer et al. | 356/479 |

(Continued)

OTHER PUBLICATIONS

J. M. Schmitt, et al: Speckle in Optical Coherence Tomography, vol. 4, No. 1, Jan. 1999, pp. 95-105.

\* cited by examiner

*Primary Examiner*—Patrick J Connolly

(57) ABSTRACT

The invention relates to a method for optical coherence tomography comprising the steps of:
  providing of a reference light beam and a measurement light beam,
  combining of the reference light beam and the measurement light beam to provide a combined light beam,
  modulating of the reference light beam,
  sampling of the combined light beam to measure an amplitude of an intensity variation for each sampling position,
  adding of the amplitudes to provide an intensity signal for one picture element.
  correcting deformations and aberrations either in the electronic, or in the optical domain

13 Claims, 4 Drawing Sheets

U.S. PATENT DOCUMENTS

| | | | |
|---|---|---|---|
| 2005/0171438 A1* | 8/2005 | Chen et al. | 600/476 |
| 2005/0219545 A1* | 10/2005 | Chan et al. | 356/497 |
| 2005/0274894 A1* | 12/2005 | Fujita | 250/363.04 |
| 2006/0028652 A1* | 2/2006 | Chan et al. | 356/497 |
| 2006/0055936 A1* | 3/2006 | Yun et al. | 356/479 |
| 2006/0055939 A1* | 3/2006 | Akiba et al. | 356/497 |
| 2006/0072118 A1* | 4/2006 | Chan et al. | 356/495 |
| 2006/0077395 A1* | 4/2006 | Chan et al. | 356/497 |

…

METHOD AND ARRANGEMENT FOR OPTICAL COHERENCE TOMOGRAPHY

FIELD OF THE INVENTION

The present invention relates to the field of medical imaging, and more particularly to optical coherence tomography (OCT).

BACKGROUND AND PRIOR ART

OCT is a known technique for non invasive cross-sectional imaging in biological systems. OCT uses coherence interferometry to produce a two-dimensional image of optical scattering from internal tissue micro structures in a way that is analogue to ultra sonic pulse-echo imaging.

In coherence reflectrometry, the coherence property of light reflected from a sample provides information on the time-of-flight delay from the reflective boundaries and back scattering sites in the sample. The delay information is then used to determine the longitudinal location of the reflection sites. The OCT system performs multiple longitudinal scans at a series of lateral locations to provide a two-dimensional map of reflection sites in the sample. Corresponding OCT systems are known from U.S. Pat. No. 5,847,827 and U.S. Pat. No. 6,057,920 and J. Biomed. Opt. 4(1), 157-173 (1996).

A common disadvantage of prior art OCT systems is that a high lateral resolution is inevitably associated with a strong decrease in available scanning depth. The present invention therefore aims to provide an improved method for optical coherence tomography and a corresponding computer program product and arrangement for optical coherence tomography.

SUMMARY OF THE INVENTION

The present invention provides for a method for optical coherence tomography whereby the combined light beam which results from the combination of the reference light beam and the measurement light beam is sampled. For each of the sampling positions an amplitude of the intensity variation due to interference is determined when the reference light beam is modulated. The amplitude is also referred to as modulation depth.

The amplitudes of the individual sampling positions are then added which provides an intensity signal for one picture element. This intensity signal has an improved quality, which is due to the fact that adding amplitudes while neglecting phase information allows the use of a higher collection angle (or numerical aperture), without the reduction in depth range that occurs in prior art oct systems with a higher NA. In particular the effect of speckle can be reduced this way (cf. Journal of Biomedical Optics 4(1), 95-105 (January 1999), "Speckle in Optical Coherence Tomography", J. M. Schmitt, et al.).

In accordance with a preferred embodiment of the invention the phase information of the intensity variations at the sampling positions is used for compensating the respective phase offsets. This is done by controlling an adjustable optical filter having an adjustable optical element for each of the sampling positions.

This way an optical system having a high numerical aperture can be used without limiting the scanning depth to the focal region of the optical system, while fully exploiting the resolution gain due to the high numerical aperture.

BRIEF DESCRIPTION OF THE DRAWINGS

In the following preferred embodiments of the invention will be described in greater detail by making reference to the drawings in which.

DETAILED DESCRIPTION

Figure 1:
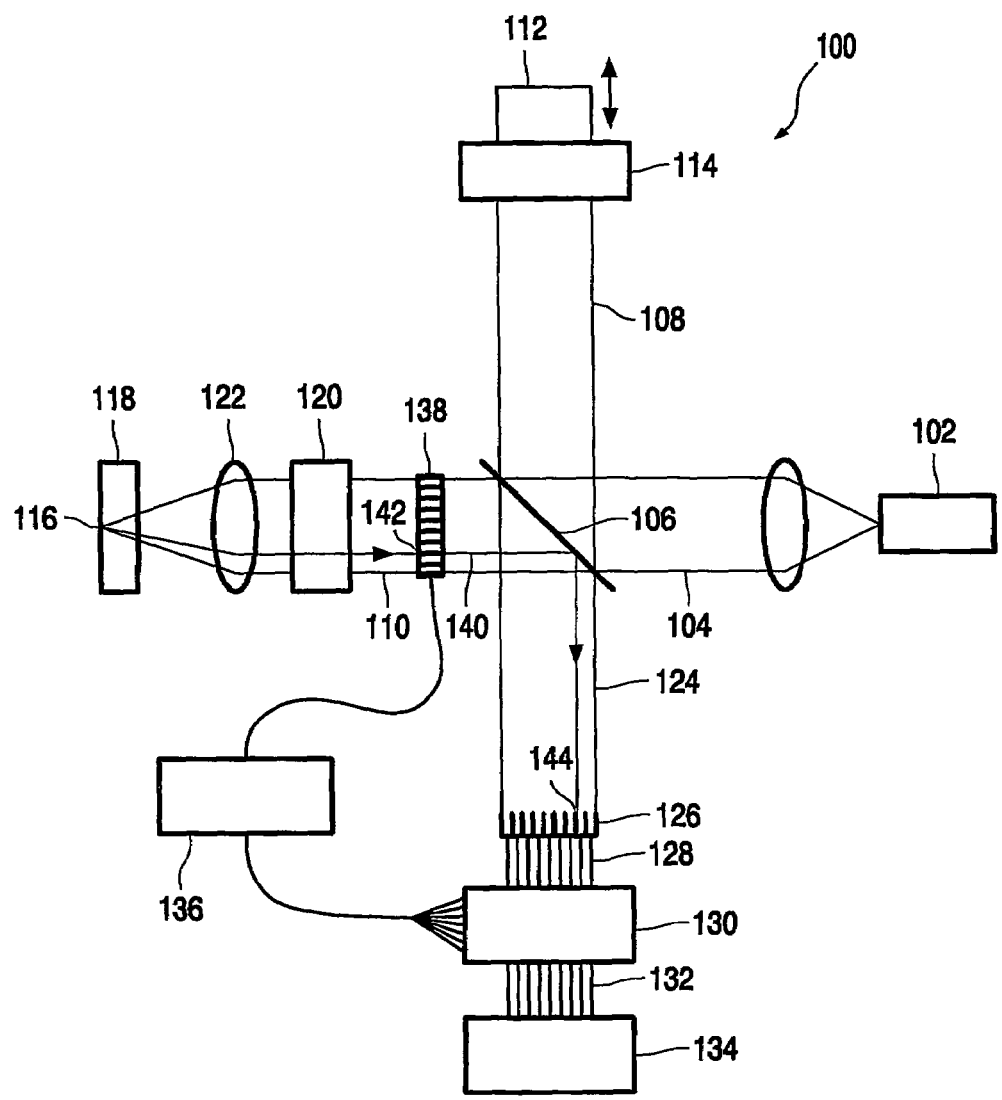
FIG. 1 is a block diagram of an embodiment of the present invention.

FIG. 1 shows an OCT system 100. The OCT system 100 has a light source 102. The low-coherence light beam 104 provided by light source 102 is directed on beam splitter 106 to provide a reference light beam 108 and measurement light beam 110. In operation the light source 102 outputs low-coherence light.

Reference light beam 108 can be modulated by longitudinal movement of reference mirror 112 and/or by modulator 114. The modulation of the reference light beam 108 by means of reference mirror 112 and/or by means of modulator 114 is as such known from the prior art.

Alternatively the modulation can be performed by modulating the frequency of the reference light beam 108 by means of modulator 114. In this instance an acousto-optic modulator can be used for providing frequency modulation in the range of 1 kHz or up to 1 MHz.

Measurement light beam 110 is focused on point 116 in object 118 by means of scan unit 120 and objective lens 122. The reflected measurement light beam 110 and the reflected reference light beam 108 are superimposed to provide combined light beam 124. The modulation of the reference beam results in an intensity modulation in the combined beam due to interference only when there is a reflecting site inside the imaged object 118 such that the difference in optical path length between on the one hand the light that has travelled to that site and back to the beam splitter 106, and on the other hand the light that has travelled to the reference mirror 112 and back to the beam splitter 106 is less than the coherence length of the light source 102. Thus, the reference mirror selects a window inside the object with a width equal to the coherence length of the light source.

Combined light beam 124 is sampled in a plane which is perpendicular to combined light beam 124. An array of photo detector elements 126 is provided for sampling combined light beam 124. Each of the photo detector elements of the array 126 delivers an electrical measurement signal for the intensity of the light impinging on the surface of the corresponding detector element. Each of the electrical measurement signals is transmitted by a separate line 128 to signal processing unit 130. Signal processing unit can be realized as an analogue or a digital device.

Signal processing unit 130 provides an amplitude signal for each one of the photo detector elements via corresponding lines 132 to image processing unit 134.

The corresponding wave front of the measurement light beam 110 is focused on point 116 and reflected back from object 118. When this reflection occurs the wave front profile is altered. This effect is also referred to as aberration. The magnitude and shape of the aberration depends on the various light paths through object 118 of the measurement light beam 110. As a consequence the interference of the reflected measurement light beam 110 with the reflected reference light beam 108 is non-uniform due to the modified wave front profile of the reflected measurement light beam.

Hence there can be constructive interference at a sampling position of one photo detector element of array 126 while there is destructive interference at another sampling position at the same time. When the reference light beam 108 is modulated this translates into a corresponding non-uniform intensity variation at the various sampling positions provided by array 126.

For each one of the sampling positions an amplitude of the intensity variation during the modulation of the reference light beam 108 is measured. All of the measured amplitudes are added irrespective of the phases of the intensity variations to provide a single intensity signal. This intensity signal is the resulting image information for point 116.

If the signals from the detector elements were added directly (as would be the case for one single large area detector as used in prior art systems) intensity variations at one position would cancel out intensity variations with opposite phase at another position, resulting in signal loss and information loss.

By means of scan unit 120 object 118 can be scanned in order to provide a tomographic image by image processing unit 134.

In addition the signal processing unit 130 can also provide phase information for the intensity variations of the individual photo detector elements. For this purpose an arbitrary reference phase can be defined. The phase offset of each of the intensity variations of the photo detector elements of array 126 due to the modulation of the reference light beam 108 is provided from signal processing unit 130 to control unit 136. Control unit 136 is coupled to adaptive optical filter 138.

Adaptive optical filter 138 has an array of adjustable optical elements. Each one of the adjustable optical elements is assigned to one of the sampling positions provided by array 126. For example the adjustable optical elements can be realized by means of a controllable LCD element.

Control unit 136 controls the adaptive optical filter 138 in order to compensate the phase offsets which are determined by the array 126.

For example, the reflected measurement light beam 110 comprises light path 140 going through optical element 142 of adaptive optical filter 138. Light path 140 extends to beam splitter 106 from where it goes to photo detector element 144 of the array 126. In other words light path 140 defines a one to one relationship between optical element 142 and photo detector element 144. The light which impinges on photo detector element 144 via light path 140 is measured by photo detector element 144 in order to determine the local amplitude of the interference pattern.

The phase offset of the intensity variation of the measurement signal provided by photo detector element 144 is provided to control unit 136. Control unit 136 has a suitable control filter such as a proportional integral (PI) or a proportional integral differential (PID) filter to provide a compensation phase. A corresponding control signal is outputted by control unit 136 such that the optical element 142 is controlled to apply this compensation phase to the light of measurement light beam 110 going through optical element 142 on light path 140. This way a control loop is formed in order to compensate the change of the wave front profile which is caused by the reflection of the measurement light beam 110 on the object 118.

It is a particular advantage of using a control loop for compensating the modification of the wave front profile that aberration is thereby corrected and defocus is also compensated. This enables to use an objective lens 122 having a large numerical aperture for improved resolution. The geometrical focus will in this case automatically follow the depth scan provided by the reference mirror 112.

It is to be noted that deformations and aberrations can be corrected either in the electronic, or in the optical domain.

Figure 2:
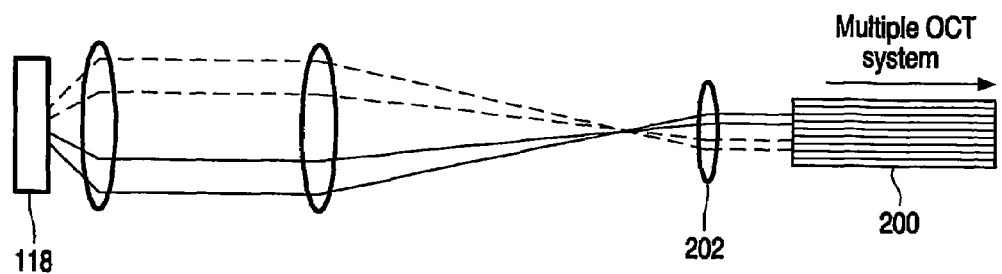
FIG. 2 is illustrative of an OCT system using a bundle of optical fibres.

FIG. 2 shows an alternative embodiment. A fiber bundle 200 is located inside the image of the objective lens pupil 202. The fiber bundle 200 can be used as an adaptive optical filter by selectively applying stress on individual fibres of the fiber bundle 200. By application of stress onto an individual fiber of the fiber bundle 200 a phase shift of the light going through that fiber is induced. Hence, fiber bundle 200 has a function which is analogous to optical element 142 of FIG. 1. For simplicity the light source, the reference light beam and the combined light beam with the associated optical elements are not shown in the embodiment of FIG. 2.

Figure 3:
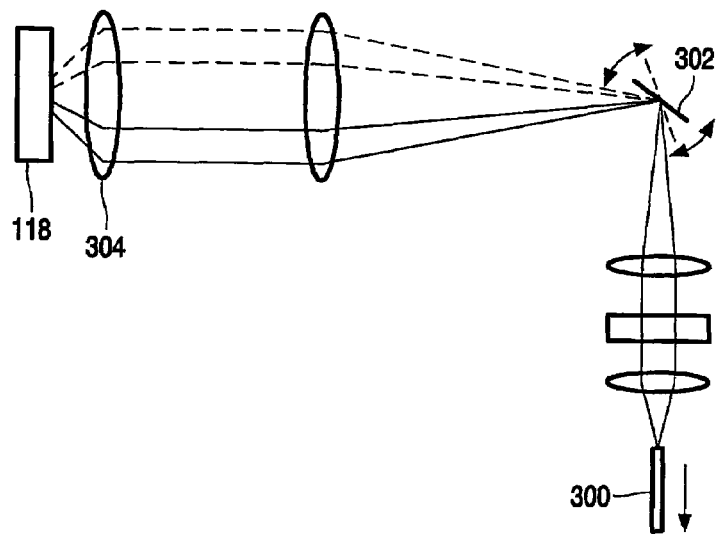
FIG. 3 is illustrative of an OCT system using a single optical fiber for receiving the combined light beam, while sequentially sampling the combined beam.

FIG. 3 is illustrative of a sequential sampling set-up.

As opposed to the embodiments of FIGS. 1 and 2 the sampling is not performed in parallel by using multiple photo detector elements but sequentially using a single optical fiber 300 as a receiver for the combined light beam (cf. combined light beam 124 of FIG. 1). In the embodiment considered here the sampling is performed by pivoting of scanning mirror 302. This way the scanning mirror moves the limited numerical aperture of the OCT set-up across the higher numerical aperture of the objective lens 304. In the case of a moving object (in-vivo measurements) motion compensation algorithms can be used to correct for artifacts that occur when the object is moved during the scan over the combined beam.

Figure 4:
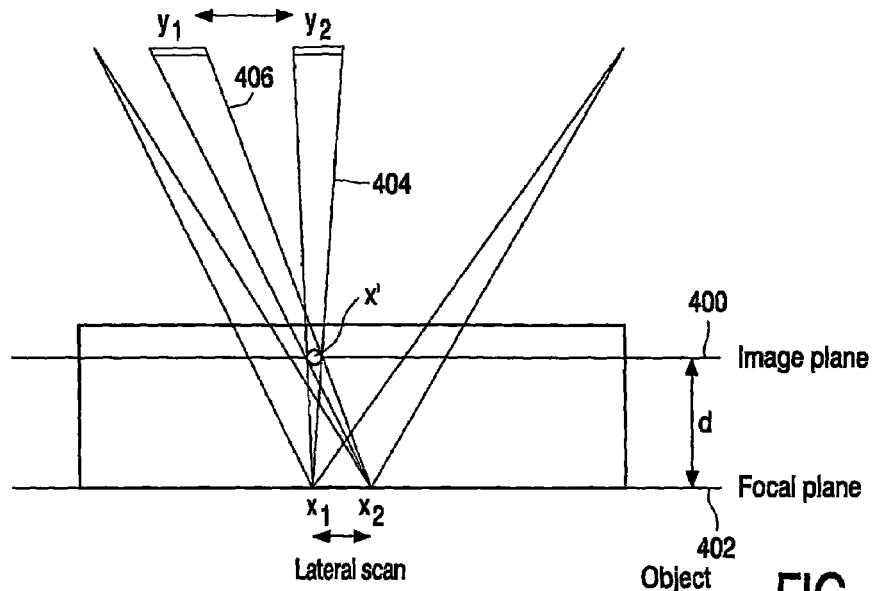
FIG. 4 is a schematic diagram illustrating the image acquisition for pixels outside the focal plane.

FIG. 4 is illustrative of the principles for generating an image for image plane 400 which is displaced from focal plane 402 of the objective lens by a depth d.

In order to obtain an intensity value for the picture element x' on image plane 400 a lateral scan is performed on focal plane 402. In particular the lateral scan is performed in order to obtain intensity signals for the picture elements $x_1$, $x_2$, .... Each of the picture elements $x_j$ has an assigned light cone containing the picture element x' on image plane 400. For example picture element $x_1$ on focal plane 402 has light cone 404 containing the picture element x'; likewise picture element $x_2$ on focal plane 402 has light cone 406 which also contains the picture element x'.

Light cone 404 contains reflected light which is detected on a position $y_1$ when the sampling of the combined light beam for acquiring an intensity signal for the picture element $x_1$ is performed. Likewise $y_2$ designates another sampling position for the measurement of light cone 406 when the data acquisition to provide the intensity signal for the picture element $x_2$ is performed. In general each one of the picture elements $x_j$ on the focal plane 402 has a corresponding sampling position $y_j$ for measurement of the light cone containing the picture element x'.

If an array of detector elements is used as it is the case in the embodiments FIGS. 1 and 2 $y_j$ designates one of the photo detector elements of the array (cf. array 126 and photo detector element 144 of FIG. 1).

The intensity signal for the picture element x' is obtained by adding of the amplitudes obtained for the light cones 404, 406 ... during the sequential lateral scan within focal plane 402. By doing this for all picture elements on image plane 400 this way an image can be calculated for image plane 400 which is distanced from the focal plane 402 even without using the adaptive optical filter of FIGS. 1 and 2 (adaptive optical filter 138 of FIG. 1 and fiber bundle 200 of FIG. 2).

Expressed in mathematical terms the intensity signal I for the picture element x' is obtained as follows:

$$I(x',d) = \text{Sum}_j [S_j(x'-(d/f)y_j, d)] \quad (1)$$

where

Figure 5:
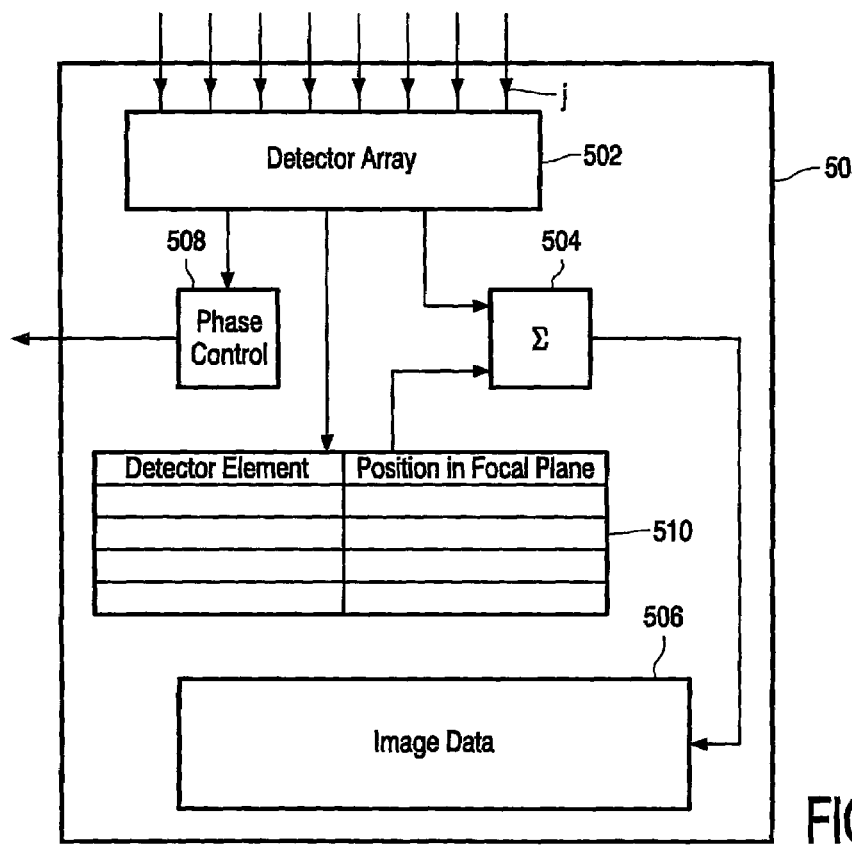
FIG. 5 is a block diagram of a signal processing system.

I(x',d): Intensity signal for picture element x'
j: Index for sampling position
yj: Location of the jth sampling position
Sj(xi,d): Intensity signal if only data from the jth position is used
f. Focal length of the objective lens
x': x'=xi+(d/f)yj FIG. 5 is illustrative of an electronic device 500 for optical coherence tomography in accordance with the present invention. Electronic device 500 can be realized by a number of separate physical units or it can also be realized as a "system on chip".

Electronic device 500 has an array of photo detector elements 502 (cf. array 126 of FIG. 1). Each of the array elements $y_i$ receives a portion of the combined light beam on a corresponding light path j.

When the reference light beam is modulated the amplitude of the intensity variation is measured for each of the sampling positions $y_j$. The amplitude information of all the sampling positions is added by integrator 504. The resulting intensity data is outputted as an image data for the actual picture element and stored in storage 506.

Further the phase offset of each of the intensity variations on the sampling positions $y_j$ is inputted into phase control 508. If an adaptive optical filter is available in the light path of the measurement light beam, phase control 508 can form a control loop with the adaptive optical filter in accordance with the principles as explained with respect to FIG. 1 in order to compensate aberration and defocus.

If such an adaptive optical filter (cf. adaptive optical filter 138 of FIG. 1) is not available the approach as explained with respect to FIG. 4 is used as an alternative for calculating image data for image planes which are outside the focal plane. For this purpose all of the amplitudes of the intensity variations measured at the sample position $y_j$ are stored with the corresponding picture element $x_i$ as a key in storage 510. By means of this data basis integrator 504 evaluates the above formula 1 in order to calculate intensity data for picture elements x' which are on an image plane outside the focal plane. Again this image data is stored in storage 506.

Figures 6A, 6B, 6C:
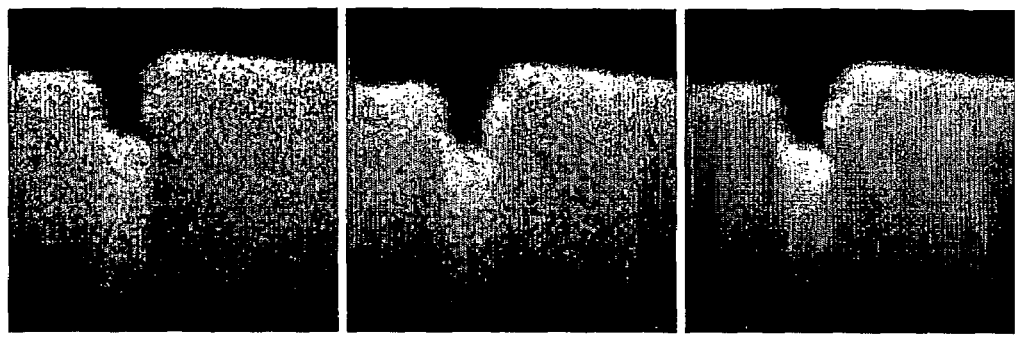
FIG. 6 shows an image acquired in accordance with the principles of the present invention in comparison to prior art image acquisition.

FIG. 6 illustrates the beneficial effect of the present invention.

The image a) of FIG. 6 has been acquired by means of OCT without compounding. Image b) has been obtained by averaging different images but also without compounding. Image c) has been obtained by averaging across different regions with compounding in accordance with the embodiment of FIG. 3 without usage of an adaptive optical filter. Speckle noise in the image c) is clearly suppressed in comparison with images a) and b). In particular, the image b) demonstrates that averaging of images alone is not sufficient to suppress speckle.

LIST OF REFERENCE NUMERALS

100 OCT system
102 light source
104 low-coherence light beam
106 beam splitter
108 reference light beam
110 measurement light beam
112 reference mirror
114 modulator
116 point
118 object
120 scan unit
122 objective lens
124 combined light beam
126 array of photo detector elements
128 line
130 signal processing unit
132 line
134 image processing unit
136 control unit
138 adaptive optical filter
140 light path
142 optical element
144 photo detector element
200 fiber bundle
202 objective lens pupil
300 optical fiber
302 scanning mirror
304 objective lens
400 image plane
402 focal plane
404 light cone
406 light cone
500 electronic device
502 array
504 integrator
506 storage
508 phase control
510 storage

The invention claimed is:

1. A method for optical coherence tomography comprising the steps of: providing of a reference light beam and a measurement light beam, combining of the reference light beam and the measurement light beam to provide a combined light beam, modulating of the reference light beam, sampling of the combined light beam to measure an amplitude of an intensity variation for each sampling position, determining a phase offset of the intensity variation of each sampling position with respect to a phase reference, providing of an adjustable optical filter for the measurement light beam, controlling of the adjustable optical filter to compensate the phase off sets, and adding of the amplitudes to provide an intensity signal for one picture element.

2. The method of claim 1, the adjustable optical filter having an adjustable optical element for each of the sampling positions, further comprising controlling each of the adjustable optical elements individually to compensate each individual phase off set.

3. The method of claim 2, wherein the adjustable optical elements are LCD elements.

4. The method of claim 1, wherein the reference light beam and the measurement light beam are provided by means of a fiber bundle.

5. The method of claim 4, whereby stress is selectively applied to individual ones of the fibers of the fiber bundle in order to compensate for corresponding phase offsets.

6. The method of claim 1, whereby a single fiber is used for receiving of the combined light beam and the sampling is performed by means of a pivotable mirror.

7. The method of claim 1, where motion compensation algorithms are used to correct artifacts resulting from motion of the object.

8. The method of claim 1, further comprising the steps of: acquiring the intensity signals as a function of depth (D) and scan position xi, where D is the distance between the image plane and the focal plane and xi the lateral position in the focal plane, reconstructing the image from the data acquired in the previous step according to the formula:

$$I(x',d) = \text{Sum}_j [S_j(x'-(d/f)y_j,d)]$$

whereby I(x',d): Intensity signal for picture element x' j: Index for sampling position yj: Location of the jth sampling position Sj(xi,d): Intensity signal if only data from the jth position is used f: Focal length of the objective lens x': x'=xi+(d/f)yj.

9. A computer program product, such as a digital storage medium, comprising computer program means for performing the steps of: providing of a reference light beam and a measurement light beam, combining of the reference light beam and the measurement light beam to provide a combined light beam, modulating of the reference light beam, sampling of the combined light beam to measure an amplitude of an intensity variation for each sampling position, determining a phase offset of the intensity variation of each sampling position with respect to a phase reference, providing of an adjustable optical filter for the measurement light beam, controlling of the adjustable optical filter to compensate the phase offsets, and adding of the amplitudes to provide an intensity signal for one picture element.

10. The computer program product of claim 9, the computer program means being adapted to perform the steps of: acquiring the intensity signals of picture elements $x_i$ in a focal plane, determining an intensity signal of a picture element x' in an image plane which is distanced by a depth d from the focal plane by calculating $$I(x',d) = \text{Sum}_j [S_j(x'-(d/f)y_j,d)]$$

whereby I(x',d): Intensity signal for picture element x' j: Index for sampling position yj: Location of the jth sampling position Sj (xi,d): Intensity signal if only data from the jth position is used f: Focal length of the objective lens x': x'=xi+(d/f)yj.

11. An arrangement for optical coherence tomography comprising: means (126; 502) for sampling of a combined light beam (124) to measure an amplitude of an intensity variation for each sampling position (144), means (130; 504) for adding of the amplitudes to provide an intensity signal of one picture element, means (130, 502) for determining a phase off set of the intensity variation of each sampling position with respect to a phase reference, an adjustable optical filter (138; 200) for the measurement light beam, means (136; 508) for controlling of the adjustable optical filter to compensate the phase off sets.

12. The arrangement of claim 11, the adjustable optical filter having an adjustable optical element (142) for each sampling position.

13. The arrangement of claim 11, further comprising: acquiring the intensity signals of picture elements $x_i$ in a focal plane (402), determining an intensity signal of a picture element x' in an image plane (400) which is distanced by a depth d from the focal plane by calculating, $$I(x',d) = \text{Sum}_j [S_j(x'-(d/f)y_j,d)]$$

whereby I(x',d): Intensity signal for picture element x' j: Index for sampling position yj: Location of the jth sampling position Sj(xi,d): Intensity signal if only data from the jth position is used f: Focal length of the objective lens x': x'=xi+(d/f)yj.

* * * * *